United States Patent [19]

Coran et al.

[11] 4,380,606

[45] Apr. 19, 1983

[54] ACRYLIC COPOLYMER RUBBER/POLYVINYLCHLORIDE

[75] Inventors: Aubert Y. Coran; Raman Patel, both of Akron, Ohio

[73] Assignee: Monsanto Company, St. Louis, Mo.

[21] Appl. No.: 373,316

[22] Filed: Apr. 29, 1982

[51] Int. Cl.³ .................. C08L 33/02; C08L 23/08; C08L 27/06
[52] U.S. Cl. ................................. 525/196; 524/522; 525/221
[58] Field of Search .............. 525/196, 221; 524/222

[56] References Cited

U.S. PATENT DOCUMENTS

| | | | |
|---|---|---|---|
| 3,338,739 | 8/1967 | Rees | 525/196 |
| 4,235,980 | 11/1980 | Bateman | 525/221 |
| 4,310,638 | 1/1982 | Coran et al. | 525/183 |
| 4,327,199 | 4/1982 | Coran et al. | 525/176 |

*Primary Examiner*—Carman J. Seccuro
*Attorney, Agent, or Firm*—Larry R. Swaney

[57] ABSTRACT

Improved thermoplastic compositions comprising blends of neutralized acrylic copolymer rubber and polyvinylchloride are described.

13 Claims, No Drawings

ACRYLIC COPOLYMER RUBBER/POLYVINYLCHLORIDE

This application relates to neutralized acid containing acrylic copolymer rubber compositions containing polyvinylchloride intimately blended therewith.

BACKGROUND OF THE INVENTION

Metal ion neutralized acid containing acrylic copolymer rubbers are thermoplastic elastomeric materials useful for molded parts, but their usefulness is somewhat restricted due to their limited fabricability, especially at moderate processing temperatures.

SUMMARY OF THE INVENTION

It has now been discovered that improved thermoplastic compositions comprising at least partially neutralized acid containing acrylic copolymer rubber are obtained by blending polyvinylchloride resin (PVC) therewith. The improved compositions are stronger and exhibit better oil resistance than compositions containing no PVC. In addition, parts can be fabricated from the compositions at temperatures below those required for the neutralized rubber alone. Also, compositions containing major proportions of PVC exhibit greater toughness and impact resistance than PVC without the rubber.

Improved properties are obtained with compositions comprising about 20 to 98 parts by weight of neutralized acid containing acrylic copolymer rubber and about 80 to about 2 parts by weight of PVC per 100 parts by weight of said rubber and PVC combined. When the amount of PVC is not more than 50 weight percent of the composition, thermoplastic elastomeric (elastoplastic) compositions are obtained.

Thus, an elastoplastic composition of the invention comprises a blend of PVC in an amount up to 50 weight percent of the composition, and neutralized acid containing acrylic copolymer rubber, in an amount sufficient to impart rubberlike elasticity up to 98 weight percent of the composition, which composition is processable as a thermoplastic and is elastomeric. The composition can contain plasticizer for PVC or rubber. For the elastomeric compositions of the invention, however, if the composition contains more PVC than rubber, sufficient plasticizer must be present to impart rubberlike elasticity to the composition. Compositions frequently contain plasticizer in amounts not exceeding the weight of the PVC. In other words, in compositions containing 50 weight percent or less of PVC, plasticizers optionally may be present but they are not required to obtain elastoplasticity unless the amount of PVC exceeds 50% of the weight of the composition.

Preferred elastoplastic compositions of the invention comprise about 98 to 55 parts by weight of neutralized acid containing acrylic copolymer rubber and about 2 to 45 parts by weight of PVC per 100 parts by weight of said rubber and PVC combined. More preferred compositions exhibiting high strength, high elongation, and low Young's modulus comprise metal ion neutralized acid containing acrylic copolymer rubber and about 10 to 40 parts by weight of PVC per 100 parts by weight of said rubber and PVC combined.

The compositions may be prepared by melt mixing, preferably by mastication, above the softening temperature of the PVC, neutralized acid containing acrylic copolymer rubber and PVC in the indicated proportions. A more preferred procedure comprises melt mixing the acid containing acrylic copolymer rubber and PVC until a homogeneous composition is obtained, then an acid polymer neutralizing agent, for example, a source of metal ion such as magnesium or calcium oxide is added and mixing is continued until neutralization of the acid occurs. Metal ions such as $Zn^{++}$, $Fe^{+++}$, $Sn^{++}$, $Sn^{++++}$, $B^{+++}$, etc. should be avoided since their halides catalyze PVC decomposition.

The acid containing acrylic copolymer rubber should be at least 10 percent up to 100 percent neutralized by metal ions. Preferably, the rubber is about 20 to 90 percent neutralized. More preferably, enough neutralizing agent is used to neutralize at least 50 percent of the acid when the carboxylated rubber contains less than 2 mole percent of carboxyl group. Lesser percents of carboxylic acid group neutralization are preferred for more highly carboxylated rubbers. Depending upon the source of metal ion, typically about 0.5 to 5 parts by weight of metal compound per 100 parts by weight of rubber is adequate. Suitable metal ions include those of alkali metals and alkaline earths.

Suitable acid containing acrylic copolymer rubbers comprise rubbery ethylenically unsaturated carboxylic acid-acrylic ester-olefin polymers. The rubber of the inventin must contain at least about 25 mole percent of a mixture of acrylic or methacrylic acid and acrylic ester. They are distinguished from polyacrylate rubbers which generally are essentially acrylic ester polymers. Suitable rubbers include acrylic acid-acrylic ester-alpha-olefin terpolymers which are essentially noncrystalline and have glass transition temperatures (Tg) below room temperature. Suitable rubbers are preferably prepared by the polymerization of a mixture of alkyl acrylate, acrylic acid or methacrylic acid and an alpha olefin of 2-8 carbon atoms. A typical acrylic copolymer rubber is a polymer of ethylene, $C_1$-$C_4$ alkyl acrylate and acrylic acid. A more preferred acrylic acid rubber is a polymer comprising at least 50 mole percent of ethylene, about 0.5 to 10 mole percent of acrylic acid and about 15 to 49.5 mole percent of alkyl acrylate.

Suitable polyvinylchloride resins (PVC) include resinous homopolymer of vinyl chloride and copolymers of vinyl chloride with monomers such as vinylidene chloride, propylene, or vinyl acetate. Generally, a copolymer may contain up to 20 mole percent of comonomer. PVC homopolymer is a well known commodity, readily available from many sources.

In the compositions of the invention, a sufficient number of the acid groups of the rubber molecules are in the form of carboxylate salt groups which comprise at least 0.1 mole percent or preferably at least 0.25 mole percent of the rubber monomer composition. A preferred neutralized acrylic copolymer rubber of the invention comprises about 1 to 5 weight percent of acrylic acid and about 0.5 to 4 parts by weight of metal oxide per 100 parts by weight of rubber.

One aspect of the invention comprises adding a plasticizer to the blend; the plasticizer extends the range of proportions of PVC in the composition while still retaining elastoplasticity. For example, without plasticizer, the weight of PVC cannot exceed the weight of rubber without the composition losing its rubberlike elasticity. But with plasticizer, the weight of PVC may exceed the weight of rubber so long as the amount of PVC does not comprise more than 50 weight percent of the total composition. Generally, the quantity of plasticizer, when present, is 1-30 weight percent but it may comprise up to 65 weight percent of the total composition. Any PVC or acrylic copolymer rubber plasticizer may be used. Preferred plasticizers have low volatility, i.e., having a boiling point of at least 300° C. More preferred plasticizers have vapor pressures of less than 200 mm Hg, more preferably, less than 100 mm Hg, at 300° C. Suitable plasticizers are selected from the group consisting of phthalate plasticizers, adipate plasticizers, phosphate plasticizers, and glycolate plasticizers. A preferred subclass of plasticizers are selected from the group consisting of dialkyl phthalate plasticizers and phthalyl glycolate plasticizers.

Examples of suitable plasticizers are dibutyl phthalate, dicyclohexyl phthalate, diethyl phthalate, diisodecyl phthalate, dimethyl phthalate, di(2-ethylhexyl) phthalate, diphenyl phthalate, diundecyl phthalate, mixed $C_7$-$C_{11}$ dialkyl phthalate, butyl benzyl phthalate, benzyl phthalate, di(2-ethylhexyl)-adipate, mixed $C_7$-$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$-$C_9$ alkyl trimellitate. For examples of other suitable plasticizers, refer to *Encyclopedia of Chemical Technology*, Vol. 10, Plasticizers, pages 780-797.

The properties of the compositions of the invention may also be modified by the addition of other ingredients which are conventional in the compounding of acrylic rubber or PVC. Examples of such ingredients include carbon black, silica, titanium dioxide, clay, coupling agents such as silanes or titanates, stabilizers, antidegradants, processing aids, adhesives, tackifiers, waxes, and discontinuous fibers such as wood cellulose or glass fibers, etc. The incorporation of particulate filler into the rubber, preferably prior to melt mixing or neutralization of the acid groups is particularly recommended. The particulate filler is generally masterbatched with the rubber which is then mixed with the PVC. Typical additions of particulate fillers or reinforcement fillers such as silica or carbon black comprise about 15-80 parts by weight of filler per 100 parts by weight of rubber. The amount of particulate filler which can be used depends, at least in part, upon the type of filler and the presence of other ingredients such as plasticizer.

Thermoplastic compositions of the invention are useful for making a variety of articles such as hoses, belts, gaskets, moldings and molded parts. They are particularly useful for making articles by extrusion, injection molding and compression molding techniques. Compositions of the invention are also especially useful for parts which are exposed to organic liquids.

Tensile properties of the compositions are determined by ASTM procedures D-1708-66 and D-638. Specimens are pulled with a tensile tester at 2.54 cm. per minute up to 30 percent elongation and 25.4 cm. per minute to failure (unless specified otherwise).

The term "elastomeric" as used herein and in the claims refers to rubberlike elasticity of a composition which possesses the property of forcibly retracting within ten minutes to less than 150% of its original length after being stretched at room temperature to twice its unstressed length and held for ten minutes before release (e.g. tension set is 50% or less). True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubbery compositions having tension set values of about 45% or less. A more preferred composition additionally has a Shore D hardness of 40 or below or a Young's modulus E below about 100 MPa.

DESCRIPTION OF THE PREFERRED EMBODIMENTS

Compositions illustrating the invention are prepared by charging PVC, acid containing acrylic copolymer rubber, and magnesium oxide in the indicated amounts (all parts by weight), into a Haake Rheocord mixer. The mixing speed is varied to maintain the stock temperature between 190°-200° C. After the PVC is melted the components are mixed for ten minutes during which the mixing torque increases. Test specimens are prepared by compression molding at about 210° C. Properties of the molded sheet are then measured and recorded.

Materials used to illustrate the invention are as follows: Acid containing acrylic copolymer rubber purchased under the tradename of Vamac believed to be a terpolymer of about 73 mole percent of ethylene, about 26 mole percent methyl acrylate and about one mole percent of acrylic acid, PVC purchased under the tradename GEON 102 EPS, methyltinmercaptide PVC stabilizer purchased under the tradename Advastab® TM-181, and magnesium oxide purchased under the tradename Maglite D.

The effect of PVC/rubber proportions is shown in Table 1. The magnesium oxide level is held constant at 3 parts by weight per 100 parts by weight of rubber. The rubber is Vamac N-123 supplied in the form of a masterbatch of 100 parts of rubber and 23 parts of fumed, silica, stabilizers and processing aids. The PVC is first blended with PVC stabilizer (TM-181) and the masterbatch added to the mixer. For convenience, the amount of rubber, silica (plus rubber stabilizers and processing aids), PVC, and PVC stabilizer are shown separately in the tables. The data show that incorporating PVC into the neutralized rubber results in improved properties including high tensile strength, better (lower) oil swell and fabricability. Stock 9 illustrates an impact resistant PVC composition which composition exhibits an Izod impact of 27.4 foot pounds per inch notch.

The effect of neutralization of the acid containing acrylic rubber by addition of magnesium oxide is shown in Table 2. The preparation procedure and the components of the compositions are the same as in Table 1. The proportions of components are indicated in the table. The amount of magnesium oxide is varied from one-half part to 3 parts by weight of magnesium oxide per 100 parts by weight of rubber. The data show that tensile strength and true stress at break, TSB, are improved by additions of magnesium oxide.

TABLE 1

|  | 1 | 2 | 3 | 4 | 5 | 6 | 7 | 8 | 9 | 10 |
|---|---|---|---|---|---|---|---|---|---|---|
| Acidic Acrylic Rubber | 100 | 90 | 80 | 70 | 60 | 50 | 40 | 30 | 20 | 10 |
| PVC | 0 | 10 | 20 | 30 | 40 | 50 | 60 | 70 | 80 | 90 |
| Silica, Rubber Stabilizers | 23 | 20.7 | 18.4 | 16.1 | 13.8 | 11.5 | 9.2 | 6.9 | 4.6 | 2.3 |

TABLE 1-continued

|  | 1 | 2 | 3 | 4 | 5 | 6 | 7 | 8 | 9 | 10 |
|---|---|---|---|---|---|---|---|---|---|---|
| & Processing Aids |  |  |  |  |  |  |  |  |  |  |
| PVC Stabilizer | 0 | 0.2 | 0.4 | 0.6 | 0.8 | 1.0 | 1.2 | 1.4 | 1.6 | 1.8 |
| MgO | 3.0 | 2.7 | 2.4 | 2.1 | 1.8 | 1.5 | 1.2 | 0.9 | 0.6 | 0.3 |
| Properties |  |  |  |  |  |  |  |  |  |  |
| TS, MPa | 16.3 | 17.7 | 20.4 | 19.4 | 24.3 | 26.1 | 27.4 | 28.4 | 27.7 | 39.1 |
| $M_{100}$, MPa | 3.9 | 4.4 | 6.1 | 8.3 | 12.3 | 17.1 | 21.7 | 25.9 | 27.5 | — |
| E, MPa | 3.7 | 3.9 | 6.9 | 14.1 | 38.4 | 112 | 330 | 642 | 1070 | 1336 |
| Ult. Elong., % | 470 | 500 | 460 | 390 | 360 | 300 | 270 | 210 | 120 | 57 |
| Ten. Set, % | 7 | 9 | 13 | 23 | 45 | 67 | 70 | 81 | F | F |
| TSB, MPa | 92 | 107 | 114 | 95 | 113 | 105 | 101 | 89 | 62 | 61 |
| Shore D Hardness | 22 | 24 | 28 | 30 | 38 | 48 | 57 | 68 | 74 | 78 |
| Oil Swell, wt. % (ASTM No. 3 70h @ 121° C.) | 47 | 50 | 46 | 38 | 33 | 28 | 21 | 16 | 11 | 5 |

TABLE 2

|  | 1 | 2 | 3 | 4 | 5 | 6 |
|---|---|---|---|---|---|---|
| Acidic Acrylic Rubber | 60 | 60 | 60 | 60 | 60 | 60 |
| PVC | 40 | 40 | 40 | 40 | 40 | 40 |
| Silica, Stabilizers & Processing Aids | 13.8 | 13.8 | 13.8 | 13.8 | 13.8 | 13.8 |
| PVC Stabilizer | 0.8 | 0.8 | 0.8 | 0.8 | 0.8 | 0.8 |
| MgO | 0.3 | 0.6 | 0.9 | 1.2 | 1.5 | 1.8 |
| Properties |  |  |  |  |  |  |
| TS, MPa | 14.8 | 17.5 | 19.3 | 22.4 | 23.7 | 24.3 |
| $M_{100}$, MPa | 7.5 | 8.9 | 10.2 | 12.5 | 14.1 | 12.3 |
| E, MPa | 12 | 16 | 24 | 43 | 60 | 38 |
| Ult. Elong., % | 380 | 390 | 380 | 350 | 320 | 360 |
| Ten. Set, % | 17 | 22 | 37 | 41 | 43 | 45 |
| TSB, MPa | 72 | 86 | 93 | 101 | 99 | 113 |
| Oil Swell, wt. % (ASTM No. 3 70h @ 121° C.) | 39 | 37 | 36 | 33 | 33 | 33 |

The use of other metal ion sources for neutralizing the acrylic copolymer rubber results in improved blends. The procedure for preparing the compositions are the same as in Table 1. Calcium, sodium, lithium, potassium, and barium ions are satisfactory. The metals may be added in the form of oxides or salts such as acetates or carbonates.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 20 to 98 parts by weight of at least 10% partially neutralized acid containing acrylic-olefin copolymer rubber, and about 80 to 2 parts by weight of polyvinylchloride (PVC) per 100 parts by weight of said rubber and PVC combined.

2. The composition of claim 1 in which the acrylic copolymer rubber is a polymer, of ethylene and 25 mole percent or more of a mixture of acrylic or methacrylate acid and acrylic ester, and is at least 50 to 100 percent neutralized with metal ion.

3. The composition of claim 2 in which the rubber is a polymer of at least 50 mole percent of ethylene, about 0.5 to 10 mole percent of acrylic acid, and about 15 to 49.5 mole percent of alkyl acrylate.

4. The composition of claim 3 in which the PVC is a homopolymer.

5. An elastoplastic composition comprising a blend of neutralized acid containing acrylic-olefin copolymer rubber, in an amount sufficient to impart rubberlike elasticity up to 98 weight percent of the composition,, and PVC, in an amount up to 50 weight percent of the composition, with the proviso that when the amount of PVC exceeds the amount of rubber, sufficient plasticizer is present to impart rubberlike elasticity to the composition.

6. The composition of claim 5 comprising 98 to 50 parts by weight of metal ion neutralized acid containing acrylic copolymer rubber and 2 to 50 parts by weight of PVC per 100 parts by weight of said rubber and PVC combined.

7. The composition of claim 6 comprising metal ion neutralized acid containing acrylic copolymer rubber and about 10 to 40 parts by weight percent of PVC per 100 parts by weight of said rubber and PVC combined.

8. The composition of claim 7 in which the rubber is a polymer of ethylene, and 25 mole percent or more of a mixture of alkyl acrylate and unsaturated carboxylic acid.

9. The composition of claim 8 in which the rubber comprises at least 50 mole percent of ethylene, about 0.5 to 10 mole percent of acrylic or methacrylic acid, and 15 to 49.5 mole percent of alkyl acrylate.

10. The composition of claim 9 in which the PVC is a homopolymer.

11. The composition of claim 9 in which the source of metal ion is a metal oxide.

12. The composition of claim 11 in which the rubber is neutralized with magnesium ion or calcium ion.

13. The composition of claim 12 comprising a copolymer rubber containing about 1 to 5 weight percent of acrylic acid and about 0.5 to 5 parts by weight of metal oxide per 100 parts by weight of rubber.

* * * * *